INVENTOR.
LEONARD O. VLADIMIR

BY

ATTORNEY.

United States Patent Office 3,095,563
Patented June 25, 1963

3,095,563
MIXER CIRCUIT FOR RADAR SYSTEMS
Leonard O. Vladimir, Chappaqua, N.Y., assignor to General Precision, Inc., a corporation of Delaware
Filed Apr. 28, 1960, Ser. No. 25,301
11 Claims. (Cl. 343—8)

This invention relates to coherent Doppler radar systems and particularly to components thereof for deriving velocity signals from signals containing Doppler information.

Microwave navigational systems for use in helicopters must fulfill stringent requirements because helicopters can fly forward, backward and sideways, can hover, descend and ascend. Any system for such use must therefore provide signal outputs representing positive or negative velocities forward, sideways and vertically.

Frequency-modulated, continuous-wave systems have certain advantages, such as the possibility of weight reduction. In addition, when the third order sideband of the received signal is employed, and when a suitable frequency of modulation is employed, such a system is capable of low-altitude operation, which is very desirable in a system for helicopters.

The mixer circuit of this invention is especially adapted for use with frequency-modulated, continuous-wave systems for use in helicopters, but the invention is not confined to this use. It may be employed in any other coherent microwave Doppler system.

In the use of frequency-modulated continuous-wave systems, spurious frequency modulation due to ripples in the power supply, aircraft vibration, or other causes widens the returned Doppler spectrum and reduces the signal-to-noise ratio. Such unwanted frequency modulation can be easily eliminated by "Janus" mixing, that is, by subtracting the signals from two microwave beams slanted forward and aft, or from two beams slanted to either side of the aircraft toward the ground. In this operation, however, the vertical velocity information may be lost and the necessary sense of positive or negative signs of the horizontal data signals may also be lost. The present invention eliminates spurious frequency modulation effects while securing both horizontal and vertical information including direction sensing.

The present invention employs an oscillator to provide an "offset" frequency, that is, an oscillator output having a frequency to which the desired output signal frequency is added. If the mixer circuit output signal frequency be less than the offset frequency, the Doppler velocity information is indicated as having a negative sense. As a further refinement, the oscillator output is frequency multiplied to provide several frequencies. The oscillator outputs are mixed with the two Janus inputs from either an on-track or a cross-track Janus pair of beams, these pairs being in service alternately in a time-sharing arrangement. The mixed outputs are applied to both a sum mixer and a difference mixer. The sum mixer output provides a signal having a frequency representing aircraft vertical velocity and the difference mixer output provides a signal having a frequency representing aircraft ground-track velocity during the period of operation of one of the pairs of beams, and representing cross-track velocity during the period of operation of the other pair of beams.

The purpose of this invention is to provide a mixer circuit to derive three-dimensional velocity information from Doppler information.

Another purpose is to provide a mixer circuit which will preserve velocity sense while eliminating the effects of spurious frequency modulation.

A further understanding of this invention may be secured from the detailed description and drawings, in which.

Figure 1:
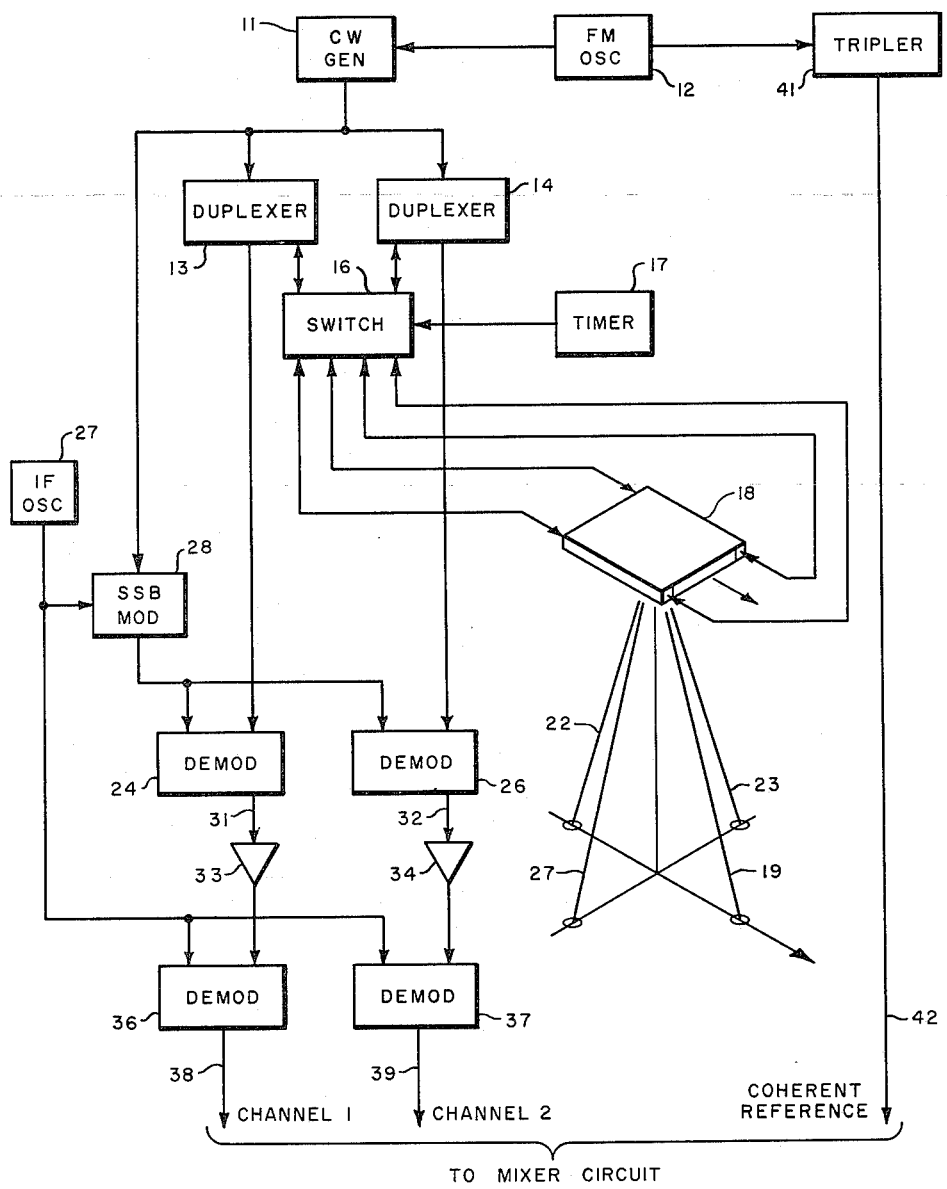
FIGURE 1 is a block diagram of an antenna-transmitter-receiver suitable for use with the invention.

Referring now to FIGURE 1, an airborne continuous-wave microwave generator 11 is frequency modulated by an oscillator 12, which may, for example, have a frequency of 1 mc. p.s. The resulting frequency-modulated signal is applied through two duplexing circuits, 13 and 14, and a switch 16 operated periodically by a timer 17, to four input terminals of a planar microwave antenna 18. This antenna is fixed in the aircraft so that, in level flight and in the absence of wind, it radiates four beams, 19, 21, 22 and 23, obliquely toward the earth. These beams are directed forward and aft along the aircraft's longitudinal axis, and to either side along the transverse axis. Each beam is radiated and its echo signals received when the circuit is closed through the switch 16 to an associated one of the four antenna terminals. The switch is arranged to close the circuits to the terminals a pair at a time, for example to energize first beams 19 and 22, then beams 21 and 23, then repeating the cycle. The timer 17 may, for example, control the beams at a frequency of five cycles per second.

Such an antenna is well suited for Janus Doppler operation, which means that in forward flight the Doppler displacement of the frequency of the echo received from beam 19 is positive, the displacement from beam 22 is negative, and their combination provides twice the Doppler displacement of either alone. A general description of Doppler radar operation is given in Proceedings of the National Electronics Conference, Chicago, 1958, volume XIV. A complete description of the antenna is given in patent application Serial No. 9,968, filed February 19, 1960.

The received signals, containing at one instant longitudinal and vertical velocity information and at another instant transverse and vertical velocity information are transmitted in channels which are individual for the separate beams through the switch 16 and duplexers 13 and 14 to demodulators 24 and 26. An intermediate frequency oscillator 27 together with a single-sideband modulator 28 generate a pseudo-local-oscillator signal in conductor 29 which is impressed on the demodulators 24 and 26 to produce intermediate frequency signals in conductors 31 and 32 representing the paired return signals. These intermediate frequency signals being derived from the frequency-modulated transmitter signals, possess frequency modulation sidebands. The third upper sideband, at a frequency equal to the intermediate frequency plus three times the modulation frequency, is especially suitable for low-level operation. The frequency spectrum there centered, including its Doppler difference information, is isolated by tuned amplifiers 33 and 34. The resulting signals are applied to two demodulators 36 and 37, where they are heterodyned with the intermediate frequency signal generated by oscillator 27 to produce four signals consisting of a carrier equal to three times the modulation frequency plus or minus the Doppler difference frequency. This carrier frequency may be termed a second intermediate frequency. These signals are transmitted through conductors 38 and 39 to the mixer circuit. A coherent reference signal is generated by tripling the oscillator 12 signal in frequency tripler 41 and is conducted to the mixer circuit by conductor 42.

Figure 2:
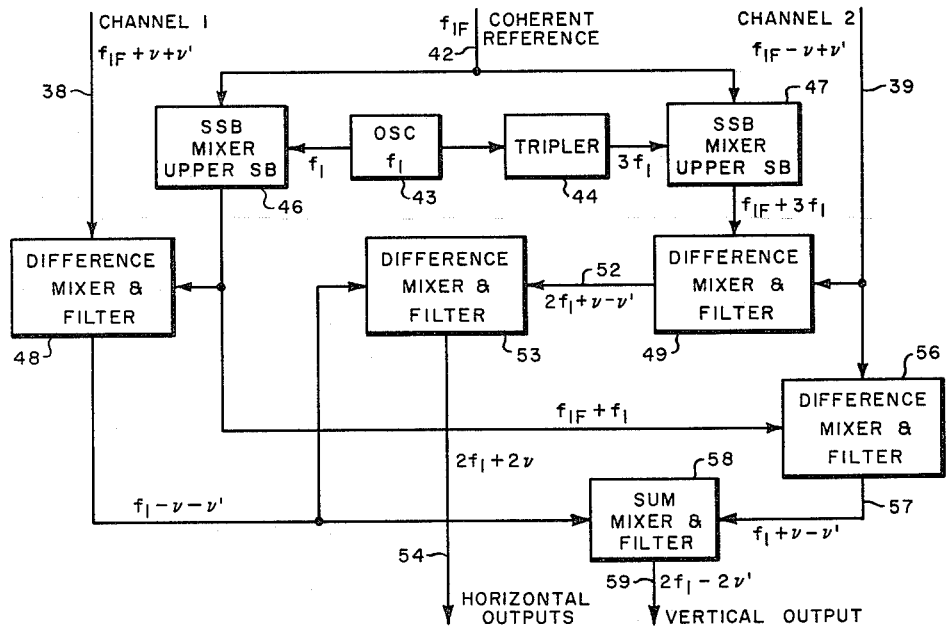
FIGURE 2 is a schematic diagram of one embodiment of the invention.

The mixer circuit of FIGURE 2 receives the four time-shared Doppler information signals from the receiver, FIGURE 1, on conductors 38 and 39. These four signals are time-shared in pairs, as mentioned. For example, when the antenna beams 19, 21, 22 and 23, FIG- URE 1, are time-shared in pairs at 5 c.p.s., then the signals received at channels 1 and 2, over conductors 38 and 39, for a period of 1/10 second, represent fore and aft signals respectively, from which velocity information will be derived by the mixer circuit representing aircraft velocity in the direction of the ground track in this case. In the general case the information will represent velocity in the direction of the aircraft longitudinal axis. For the next 1/10 second the received signals represent right and left beam echo signals, from which velocity information will be derived by the mixer circuit representing velocity in this case perpendicular to the ground track or, in the general case, in the aircraft transverse axis direction. By mixing these signals in another way, as will be described, vertical velocity information will be derived.

Let the second intermediate frequency, here for example 3 mc.p.s., be termed $f_{IF}$. Let the Doppler difference frequency in the echo signal from the forward beam, 19, when the aircraft motion is forward, be termed $+\nu$ and from the rearward beam, 22, be termed $-\nu$. During the transverse time-sharing periods, when the aircraft has transverse velocity toward its right, the Doppler difference signals from beam 21 will be termed $+\nu$, and those from beam 23, $-\nu$. When the aircraft has downward velocity, the corresponding Doppler difference frequency in any single beam signal will be termed $+\nu'$ and when the velocity is upward, $-\nu'$. The ranges of $\nu$ and of $\nu'$ may be, for example, within the limits of 0 and 9 kc.p.s.

Let it be assumed that the aircraft has velocity components forward, to the right, and downward, and also let it be assumed that, at a selected instant the corresponding frequency components of the frequency spectra of the signals received by the mixer circuit, FIGURE 2, on conductors 38 and 39 are respectively represented by $f_{IF}+\nu+\nu'$ and $f_{IF}-\nu+\nu'$. These signals are band-pass filtered by filters in the receiver, not shown in FIGURE 1, so that frequencies 600 kc.p.s. above these spectra are not transmitted to the mixer circuit, for reasons which will appear.

An oscillator 43 generates an output having a frequency $f_1$ which may, for example, be 300 kc.p.s. One oscillator output is applied to a frequency tripler 44, the output frequency of which is therefore 900 kc.p.s. The other output of oscillator 43 is applied to a single-sideband mixer 46. This mixer is conventional and consists of a four-diode balanced bridge mixer which suppresses the carrier, followed by an upper side band transmission filter. The 900 kc.p.s. output of the tripler 44 is applied to another single-sideband mixer 47 emitting the upper sideband. The coherent reference signal on conductor 42, which was derived from the modulation frequency oscillator 12, FIGURE 1, by tripling, is applied to both single-sideband mixers 46 and 47. The two mixers 46 and 47 can emit the lower sidebands instead of the upper sidebands without changing the operation of the complete circuit, but they must both emit the same sideband, i.e., either the upper or the lower.

The output of the single-sideband mixer 46 and the signal present in conductor 38 are both applied to a mixer and filter 48 so designed that only the difference sideband is transmitted. The output of the single sideband mixer 47 and the signal present in conductor 39 are both applied to a similar mixer and filter 49 so designed that only the difference sideband is transmitted. The two difference sideband signals on conductors 51 and 52 are applied to a third, similar mixer and filter 53. The difference output of this mixer at conductor 54 constitutes the first instrument output and consists of two time-shared signals having frequencies representing along-track and cross-track aircraft velocities. The output of the single-sideband mixer 46 and the signal of conductor 39 are applied to a mixer and filter 56 designed to transmit the difference sideband. The difference output at conductor 57 and the difference output of mixer 48 at conductor 51 are applied to a mixer and filter 58 designed to transmit the sum sideband. In this mixer the horizontal velocity Doppler frequency, $\nu$, is cancelled and the vertical velocity Doppler frequency, $\nu'$, remains, in addition to an offset frequency. The output of this mixer 58 at conductor 59 thus constitutes the second instrument output representing, by its frequency, vertical velocity of the aircraft.

In the operation of the circuit of FIGURE 2, the conductor 38 applies the signal $f_{IF}+\nu+\nu'$ to the difference mixer 48. The single-sideband mixer 46 also applies to the same mixer the signal $f_{IF}+f_1$. Since the function of a mixer is to multiply signals, forming upper and lower frequency sidebands, the filtered output has a frequency which is the difference of the input frequencies, and the signal in conductor 51 has the frequency $f_1-\nu-\nu'$.

The reason for careful filtering of both channel inputs appears here. If the input to channel 1 were not filtered, a broad noise spectrum would exist at this input extending through $(f_{IF}+2f_1)$ which, when subtracted in mixer 48 from the output of mixer 46, would produce a noise signal at the frequency $f_1$. This would approximately double the noise superimposed on the signal $f_1-\nu-\nu'$ in conductor 51.

The signal of frequency $(f_{IF}-\nu+\nu')$ in conductor 39 is applied to the difference mixer 49 together with the signal of frequency $(f_{IF}+3f_1)$ from mixer 47. The difference of frequency $(3f_1+\nu-\nu')$, appears in conductor 52. The signal in conductor 51 is subtracted from the signal in conductor 52 by the mixer 53 to form in its output conductor 54 a signal of the frequency $2f_1+2\nu$, the vertical velocity term cancelling out. With the values mentioned, at maximum forward speed this signal will therefore have the frequency of 618 kc.p.s. When the forward speed is zero the frequency is 600 kc.p.s. and when the helicopter has backward speed the frequency is less than 600 kc.p.s.

During the beaming period when the right-left beams generate the signals, and with wind from the left, the frequency of the output signal in conductor 54 will be greater than 600 kc.p.s. by an amount proportional to the transverse velocity of the helicopter.

The difference mixer 56 subtracts the input signal of channel 2, conductor 39, having a frequency $f_{IF}-\nu+\nu'$, from the output of the single-sideband mixer 46 of frequency $f_{IF}+f_1$ to form in conductor 57 a difference signal having the frequency $f_1+\nu-\nu'$. This signal is added in the sum mixer 58 to the signal from difference mixer 48 to produce a signal in the instrument output conductor 59 having the frequency $2f_1-2\nu'$, the horizontal frequency component being cancelled out. One-half of the amount by which this signal frequency is less than $2f_1$ represents the aircraft downward velocity. Upward velocity is represented by the amount by which the frequency is greater than $2f_1$.

It is possible for trouble to be experienced with this circuit when the output of oscillator 43, of frequency $f_1$, is not perfectly balanced out in mixers 46, 48, and 56. When it is not, there is some signal of frequency $f_1$ in each of the conductors 51 and 57. These signals are summed in the mixer 58 to form a signal of frequency, $2f_1$, which will be so close to the desired frequency, $2f_1 \mp 2\nu'$, as not to be easily separated. There is a similar, but less severe, interference at the output of the mixer 53.

Figure 3:
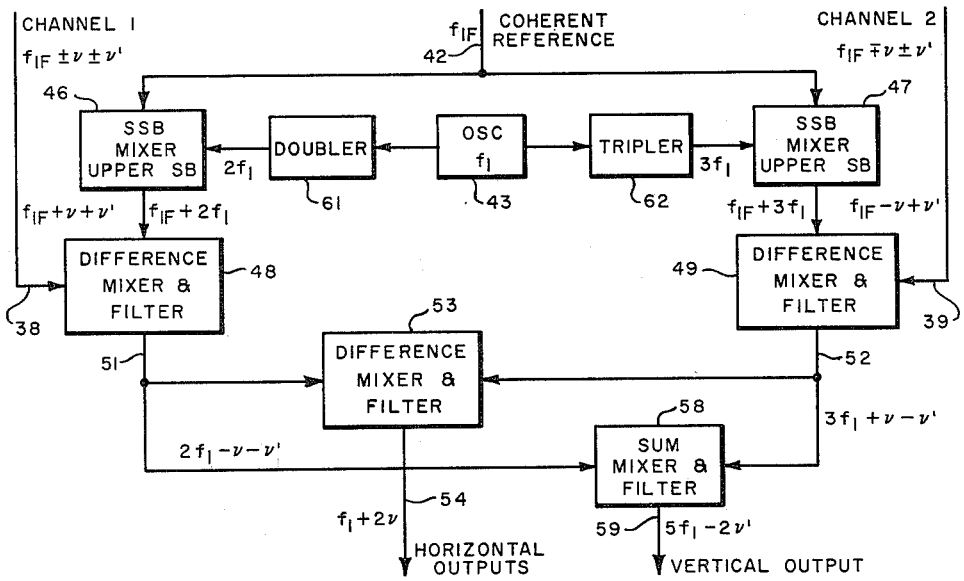
FIGURE 3 is a schematic diagram of another embodiment of the invention.

In order to eliminate these interfering signals, which may be troublesome when mixers are misadjusted, the circuit of FIGURE 3 provides different offset frequencies. The same input signals are applied to channels 38 and 39, with frequencies generalized as $f_{IF} \pm \nu \pm \nu'$ and $f_{IF} \mp \nu \pm \nu'$, and the same reference signal of frequency $f_{IF}$, coherent with the information signals, is applied at conductor 42. The oscillator 43 may in this case have an output frequency, $f_1$, of 120 k.c.p.s. The oscillator output is doubled in a frequency doubler 61 and applied to the single sideband mixer 46, transmitting the upper sideband of $f_{IF}+2f_1$. The oscillator output is also tripled in frequency in a tripler 62, then applied to the single-sideband mixer 47, which transmits the upper sideband of frequency $f_{IF}+3f_1$. These single-sideband mixers may alternatively transmit lower sidebands.

The output of the single sideband mixer 46 and the signal present in conductor 38 are applied to the mixer and filter 48, transmitting the difference sideband in conductor 51. The output of the single-sideband mixer 47 and the signal present in conductor 39 are applied to the mixer and filter 49, transmitting the difference sideband in conductor 52. Conductors 51 and 52 are connected to the mixer and filter 53, transmitting the difference sideband in conductor 54. Conductors 51 and 52 are also connected to the mixer and filter 58, transmitting the sum output in conductor 59.

Operation of the circuit of FIGURE 3 is described utilizing the same assumptions as used in connection with the description of the operation of the modification described in FIGURE 2, namely, that the helicopter has forward velocity, a velocity component toward the right, and a downward velocity component. During that part of the beaming period when the fore and aft beam returns constitute the inputs to channels 1 and 2 at conductors 38 and 39, the signal of frequency $f_{IF}+\nu+\nu'$ is applied from conductor 38 to mixer 48 and the signal of frequency $f_{IF}+2f_1$ is also applied from mixer 46. The difference output in conductor 51 has the frequency $2f_1-\nu-\nu'$. At the same time the signal of frequency $f_{IF}-\nu+\nu'$ is applied from conductor 39 to mixer 49 and that of frequency $f_{IF}+3f_1$ is applied from mixer 47. The difference output in conductor 52 has the frequency $3f_1+\nu-\nu'$. Conductors 51 and 52 apply their signals to the difference mixer and filter 53, resulting in an output signal in conductor 54 of frequency $f_1+2\nu$, the vertical velocity signal $\nu'$ cancelling out. This is the horizontal output signal, of such frequency that the component $\nu$ thereof is proportional to either the on-track or cross-track horizontal velocity, depending on which one of the time-shared microwave beam pairs has originated the signal. Conductors 51 and 52 also apply their signals to the sum mixer 58, the output signal thereof in conductor 59 having the frequency $5f_1-2\nu'$. The $\nu'$ component of this frequency is proportional to the vertical velocity of the helicopter.

The circuit of FIGURE 3 has the advantage that no input signals which may leak through unbalanced mixers toward the instrument outputs can interfere with these outputs because the leaking signals have widely differing frequencies which will not cause interference with the desired frequencies.

What is claimed is:

1. A mixer circuit for deriving signals representing horizontal and vertical velocity components of an airborne velocity-measuring radar system comprising, a pair of difference mixers, a pair of filters respectively connected to the outputs thereof transmitting lower sidebands only, means applying two input signals respectively to said pair of difference mixers, said input signals containing Doppler velocity information respectively received from a Janus pair of microwave beams, a pair of single-sideband mixers each transmitting only one sideband, an oscillator emitting two outputs of harmonically related frequencies, means applying one of said outputs to one of said pair of single sideband mixers, means applying the other of said oscillator outputs to the other of said pair of single sideband mixers, means applying a reference signal coherent with said two input signals to said pair of single sideband mixers, means applying the outputs of said single sideband mixers respectively to said pair of difference mixers, a subtractive mixer, a lower sideband transmitting filter connected to the output thereof, means applying the outputs of said pair of difference mixers to said subtractive mixer whereby the output of said lower sideband transmitting filter constitutes a mixer circuit output having a frequency representing said horizontal velocity component, a difference mixer, means applying one of said two input signals to said difference mixer, means applying the output of one of said pair of single sideband mixers to said difference mixer, an additive mixer, an upper sideband transmitting filter connected to the output thereof, means applying the output of one of said pair of difference mixers to said additive mixer, and means applying the output of said difference mixer to said additive mixer to form at the output of said upper sideband transmitting filter a mixer circuit output having a frequency representing said vertical velocity component.

2. A mixer circuit for airborne velocity-measuring radar systems comprising, a pair of difference mixers, a pair of filters respectively connected to the outputs thereof transmitting lower sidebands only, means applying first and second input signals to respective ones of said pair of difference mixers, said first input signal having a frequency equal to the sum of a carrier frequency and a data frequency and said second input signal having a frequency equal to the difference of said carrier frequency and said data frequency, a pair of single-sideband mixers each transmitting only one sideband, means applying a reference signal to said pair of single-sideband mixers, said reference signal having said carrier frequency and being coherent with the carrier components of said input signals, an oscillator applying an output signal to one of said single-sideband mixers and means applying a signal whose frequency is harmonically related to said oscillator output to the other of said single-sideband mixers whereby two single-sideband outputs lying on the same side of the reference signal frequency are emitted having different frequencies, means applying said two single-sideband outputs to respective ones of said pair of difference mixers to form first and second difference outputs, a difference mixer, means applying one of said two single-sideband outputs thereto, means applying said second input signal thereto whereby a third difference output is formed, a subtracting mixer having said first and second difference outputs applied thereto to form a lower sideband mixer circuit output having a frequency equal to a selected frequency harmonically related to said oscillator frequencies plus a frequency representing a first velocity, and an adding mixer having said first and third difference outputs applied thereto to form an upper sideband mixer circuit output having a frequency equal to said selected frequency minus a frequency representing a second velocity.

3. A mixer circuit for airborne radar systems for measuring horizontal and vertical aircraft velocity components comprising, first, second and third difference mixers, filters connected thereto transmitting lower sidebands only, means applying first and second input signals respectively to said first and second difference mixers, said first input signal having a frequency equal to the sum of a carrier frequency and horizontal and vertical velocity data frequencies, and said second input signal having a frequency equal to the difference of said carrier and horizontal data frequency plus said vertical data frequency, first and second single-sideband mixers each transmitting only a single sideband, means applying a reference signal to said first and second single-sideband mixers, said reference signal having said carrier frequency and being coherent with the carrier components of said input signals, an oscillator having an ouput frequency, a tripler actuated thereby, means applying said oscillator output to said first single-sideband mixer to form an output having a frequency equal to that of said carrier plus that of said oscillator, means applying said tripler output to said second single-sideband mixer to form an output having a frequency equal to that of said carrier plus that of said tripler, means applying the output of said first single-sideband mixer to said first difference mixer to form a first intermediate output, means applying the output of said second single-sideband mixer to said second difference mixer to form a second intermediate output, a subtractive mixer emitting the lower sideband only, means applying said first and second intermediate outputs to said subtractive mixer to form an output containing a frequency component representing horizontal velocity free of spurious frequency modulation which may be present in said first and second input signals, means applying said second input signal to said third difference mixer, means applying the output of said first single-sideband mixer to said third difference mixer to form a third intermediate output thereof, an additive mixer emitting the upper sideband only, and means applying said first and third intermediate outputs to said additive mixer to form an output having a frequency component representing aircraft vertical velocity.

4. A mixer circuit for airborne Doppler radar systems for measuring horizontal and vertical aircraft velocity components by means of microwave beams comprising, a pair of difference mixers, a pair of filters connected thereto transmitting lower sidebands only, means applying first and second input signals to respective ones of said pair of difference mixers, said first input signal having a frequency equal to the sum of a carrier frequency and a data frequency and said second input having a frequency equal to the difference of said carrier frequency and said data frequency, a pair of single-sideband mixers each transmitting only a single sideband, means applying a reference signal to said pair of single-sideband mixers, said reference signal having said carrier frequency and being coherent with the carrier components of said input signals, oscillator means applying two output signals having harmonically related frequencies to said single-sideband mixers whereby two single-sideband outputs are emitted having different frequencies, means applying said two single-sideband outputs to respective ones of said pair of difference mixers to form first and second difference outputs, a subtracting mixer having said first and second difference outputs applied thereto to form a lower sideband mixer circuit output having a frequency equal to a selected frequency harmonically related to said oscillator frequencies plus a frequency representing a first said velocity component and an adding mixer having said first and second difference outputs applied thereto to form an upper sideband mixer circuit output having a frequency harmonically related to said selected frequency minus a frequency representing a second said velocity component.

5. A mixer circuit for airborne radar systems for measuring horizontal and vertical aircraft velocity components comprising, first and second difference mixers, filters connected to the outputs thereof transmitting lower sideband signals only, means applying first and second input signals respectively to said first and second difference mixers, said first input signal having a frequency equal to the sum of a carrier frequency and Doppler beam-derived frequencies, and said second input signal having a frequency equal to the difference of said carrier frequency and one said Doppler beam-derived frequency minus another said Doppler beam-derived frequency, first and second single-sideband mixers each transmitting only a single sideband, means applying a reference signal to said first and second single-sideband mixers, said reference signal having said carrier frequency and being coherent with the carrier components of said input signals, an oscillator, a doubler actuated thereby, a tripler actuated by said oscillator, means applying said doubler output to said first single-sideband mixer to form an output of carrier plus doubler frequencies, means applying said tripler output to said second single-sideband mixer to form an output of carrier plus tripler frequencies, means applying the output of said first single-sideband mixer to said first difference mixer to form at the output of the filter thereof a first intermediate output, means applying the output of said second single-sideband mixer to said second difference mixer to form at the output of the filter thereof a second intermediate output, a subtractive mixer, a filter connected to the output thereof transmitting only the lower sideband, means applying said first and second intermediate outputs to said substractive mixer to form at the output of the filter thereof an output including a frequency representing said horizontal velocity component free of spurious frequency modulation which may be present in said first and second input signals, an additive mixer, a filter connected to the output thereof transmitting only the upper sideband, and means applying said first and second intermediate outputs to said additive mixer to form at the output of the filter thereof an output including a frequency representing said aircraft vertical velocity component.

6. A mixer circuit for airborne velocity-measuring radar systems comprising means producing a first input signal whose frequency is equal to the sum of a carrier frequency and horizontal and vertical velocity Doppler frequencies, means producing a second input signal whose frequency is equal to the difference of said carrier frequency and the horizontal Doppler frequency plus the vertical Doppler frequency, means producing a first beat signal whose frequency departs from said carrier frequency by a selected amount, means producing a second beat signal whose frequency departs from said carrier frequency by a second selected amount, first mixer-filter means having said first input signal and said first beat signal impressed thereon and producing a first difference frequency signal therefrom, second mixer-filter means having said second input signal and said second beat signal impressed thereon and producing a second difference frequency signal therefrom, and third mixer-filter means having said second input signal and said second beat signal impressed thereon and producing therefrom a third difference signal constituting an output signal of the mixer circuit.

7. A mixer circuit as set forth in claim 6 including fourth mixer-filter means having said first beat signal and said second input signal impressed thereon and producing a fourth difference frequency signal therefrom, and a fifth mixer-filter means having said first and fourth difference frequency signals impressed thereon and producing therefrom a sum frequency signal constituting another output signal of the mixer circuit.

8. A mixer circuit as set forth in claim 6 including fourth mixer-filter means having said first and second difference frequency signals impressed thereon and producing a sum frequency signal therefrom constituting another output signal of the mixer circuit.

9. A mixer circuit for airborne velocity-measuring radar systems comprising, means producing a first input signal whose freqency is equal to the sum of a carrier frequency and horizontal and vertical velocity Doppler frequencies, means producing a second input signal whose frequency is equal to the difference of said carrier frequency and the horizontal Doppler frequency plus the vertical Doppler frequency, an oscillator, means for deriving first and second output signals therefrom which have different but harmonically related frequencies, a first single sideband mixer means having a reference signal equal in frequency to that of said carrier frequency and the first output signal of said oscillator impressed thereon and producing therefrom a first single sideband signal whose frequency departs from that of said carrier frequency in a selected sense, a second single sideband mixer means having said reference signal and the second output signal of the oscillator impressed thereon and producing therefrom a second single sideband signal whose frequency departs from that of said carrier frequency in said selected sense, first mixer-filter means having said first input signal and said first single sideband signal impressed thereon and producing a first difference frequency signal therefrom, second mixer-filter means having said second input signal and said second sideband signal impressed thereon and producing a second difference frequency signal therefrom, and third mixer-filter means having said first and second difference frequency signals imposed thereon and producing a third difference frequency signal constituting an output signal of the mixer circuit.

10. A mixer circuit as set forth in claim 9 including fourth mixer-filter means having said first single sideband signal and said second input signal impressed thereon and producing a fourth difference frequency signal therefrom, and fifth mixer-filter means having said first and fourth difference frequency signals impressed thereon and producing therefrom a sum frequency signal constituting another output signal of the mixer circuit.

11. A mixer circuit as set forth in claim 9 including fourth mixer-filter means having said first and second difference frequency signals impressed thereon and producing a sum frequency signal therefrom constituting another output signal of the mixer circuit.

No references cited.